United States Patent Office 3,748,361
Patented July 24, 1973

3,748,361
HALO-SUBSTITUTED OXIME CARBAMATES
Daniel D. Rosenfeld, East Brunswick, Samuel B. Lippincott, Springfield, and John R. Kilsheimer, Westfield, N.J., assignors to Esso Research and Engineering Company
No Drawing. Continuation-in-part of application Ser. No. 718,208, Apr. 2, 1968. This application Apr. 28, 1971, Ser. No. 138,321
Int. Cl. C07c
U.S. Cl. 260—566 AC
14 Claims

ABSTRACT OF THE DISCLOSURE

Mono or poly halo-substituted oxime carbamates and phosphates characterized by either one of the following formulas:

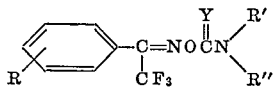

or

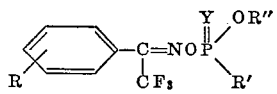

wherein R is one selected from the group consisting of hydrogen, methyl, isopropyl, ethyl, trifluoromethyl, fluorine, chlorine, bromine, methoxy, methylthio, nitro, dimethylamino, ethoxy, and isopropyloxy; R' is one selected from the group consisting of OR'', $C_1$ to $C_6$ alkyl, $C_6$ to $C_{10}$ aryl, substituted alkyl or aryl wherein said substituent groups are selected from the group consisting of methyl, ethyl, trifluoromethyl, fluorine, chlorine, bromine; R'' is $C_1$ to $C_6$ alkyl, $C_6$ to $C_{10}$ aryl, substituted alkyl, aryl wherein the substituents are the same as that enumerated for R'; Y is S or O. These compounds have shown activity as insecticides. Such oxime carbamates and phosphates can be prepared from ketones such as those of the formula:

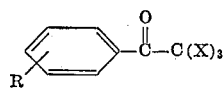

where X is halogen.

---

This is a continuation-in-part of an application by Daniel D. Rosenfeld, Samuel P. Lippincott and John R. Kilsheimer bearing Ser. No. 718,208 filed on Apr. 2, 1968, now abandoned.

Oxime carbamates and phosphates are generally known, and a number of them have been used commercially as pesticides. For example, the O-methylcarbamoyl oximes of (1) 2-methyl - 2 - (methylthiopropionaldehyde), known commercially as Temik, a systemic insecticide; (2) 3-chloro-6-cyano-2-norboranone, known commercially as Tranid, an acaricide; and (3) methyl thiomethylketone, known commercially as Lannate, all have been described in the literature, as e.g., in Farm Chemicals, November 1967, page 45 et seq., by R. L. Metcalf, H. T. Reynolds, and T. R. Fukuto. Temik has also been discussed in an article in the Journal of Economic Entomology, vol. 60, April 1967, page 445 et seq., by R. L. Metcalf, M. F. Osman, and T. R. Fukuto.

Additionally, oxime phosphates in general are known. For example, an oxime phosphate of the general formula:

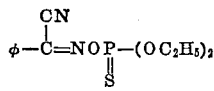

has been described in the Journal of Economic Entomology, vol. 60, No. 5, page 1195 (1967). However, none of the oxime carbamates, phosphates, or phosphonates heretofore known in the art have been characterized by the α-carbon atom having at least one halo atom, and preferably two or three halo atoms.

This invention relates to novel oxime carbamate, phosphate, and phosphonate derivatives and their use as pesticides. More particularly, this invention relates to novel mono or poly halo-substituted oxime carbamates, phosphates and phosphonates and their use as pesticides, preferably as insecticides.

In general, the oxime carbamate, phosphate, and phosphonate compounds of this invention are ordinarily prepared from the corresponding ketone or ketoxime and are characterized by the formulas:

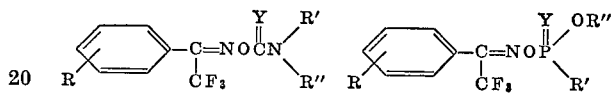

wherein R is one selected from the group consisting of hydrogen, methyl, isopropyl, ethyl, trifluoromethyl, fluorine, chlorine, bromine, methoxy, methylthio, nitro, dimethylamino, ethoxy, and isopropyloxy; R' is one selected from the group consisting of OR'', $C_1$ to $C_6$ alkyl, $C_6$ to $C_{10}$ aryl, substituted alkyl or aryl wherein said substituent groups are selected from the group consisting of methyl, ethyl, trifluoromethyl, fluorine, chlorine, bromine; R'' is $C_1$ to $C_6$ alkyl, $C_6$ to $C_{10}$ aryl, substituted alkyl, aryl wherein the substituents are the same as that enumerated for R'.

Such oxime carbamates, phosphates and phosphonates can be readily prepared by a number of different preparative methods. For example, these products can be prepared by the following method, in which an alkyl or aryl Grignard, e.g., RMgCl or RMgBr is reacted with a halogenated cyanide, carboxylic acid, or acid chloride, e.g., $R_xCN$, $R_xCO_2H$, or $R_xCOCl$ (where $R_x$ is an alkyl group substituted by halogen), to give the corresponding haloalkyl ketone. The ketone is then reacted with hydroxylamine to give the corresponding ketoxime,

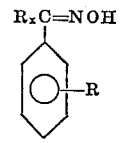

This is then reacted with either: (1) a hydrocarbyl isocyanate of the general formula RNCO to give the desired oxime carbamate; or with (2) a thiophosphoryl, thiophosphonyl, phosphoryl, or phosphonyl halide of the general formula:

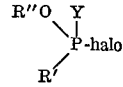

to give the desired oxime phosphate or phosphonate. R and R'' are as defined hereinabove.

All of the compounds enumerated and tested hereinbelow were synthesized by this method, with two exceptions which are as follows: (1) a parafluoro ketone was purchased and the metanitro ketone was synthesized by nitrating the purchased phenyl trifluoromethyl ketone.

The preferred novel oxime carbamate and phosphate compounds of this invention are characterized by one of the following formulas:

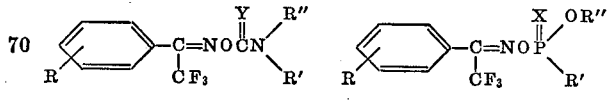

Typical especially preferred oxime carbamates illustrative of the foregoing general formula include: O-(N,N-dimethylcarbamoyl)trifluoroacetophenone oxime, O-(N,N-dimethylcarbamoyl)ortho ethoxy trifluoroacetophenone oxime and O-(N,N-dimethylcarbamoyl)ortho chloro trifluoroacetophenone oxime.

The oxime derivatives of the above general formula:

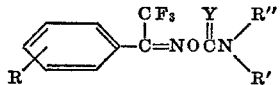

can exist as syn- or anti-isomers or as mixtures thereof, and the present invention, it is to be understood, relates to any and/or all of these forms. In this regard, it is to be noted that stereoisomeric oximes have traditionally been named by using the terminology "alpha," "syn," or "cis" for that configuration in which the reference groups are on the same side of the reference plane, and "beta," "anti," or "trans" for that configuration in which these groups are on opposite sides of the reference plane.

Typical preferred oxime phosphates illustrative of the foregoing general formula include:

O-(O,O-dimethylthionophosphoryl)trifluoroacetophenone oxime,
O-(O,O-diethylthionophosphoryl)trifluoroacetophenone oxime,
O-(O,O-diethylthionophosphoryl)p-trifluoromethyl trifluoroacetophenone oxime,
O-(O,O-diethylthionophosphoryl)m - methyl trifluoroacetophenone oxime.

Further examples of the oxime phosphates of this invention include:

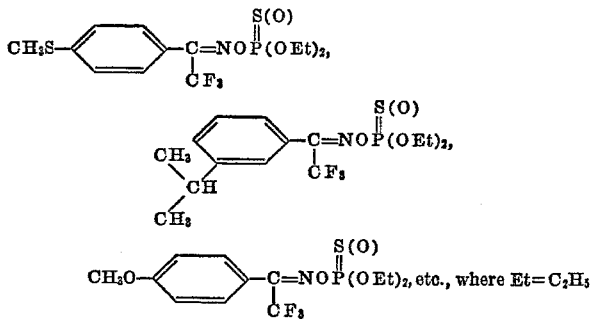

Exemplary oxime phosphonates include:

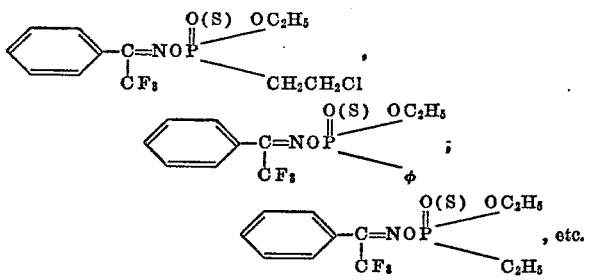

In general, the preferred oxime carbamates and phosphates of this invention include O-(N-methylcarbamoyl)meta trifluoromethyl trifluoroacetophenone oxime,
O-(N-methylcarbamoyl)meta bromo trifluoroacetophenone oxime,
O-(N-methylcarbamoyl)para methylthio trifluoroacetopheone oxime,
O-(N-methylcarbamoyl)-3,4-dioxymethylenetrifluoroacetophenone oxime,
O-(N-methylcarbamoyl)meta methyltrifluoroacetophenone oxime,
O-(N-methylcarbamoyl)meta isopropyltrifluoroacetophenone oxime,
O-(N-methylcarbamoyl)para methylsulfonyl trifluoroacetophenone oxime,
O-(N-methylcarbamoyl)-2,4-dichlorotrifluoroacetophenone oxime,
O-(N-methylcarbamoyl)-2,4-dimethoxytrifluoroacetophenone oxime,
O-(N-methylcarbamoyl)para methoxy trifluoroacetophenone oxime,
O-(N-methylcarbamoyl)para fluorotrifluoroacetophenone oxime,
O-(O-ethylchloroethylphosphonyl)trifluoroacetophenone oxime,
O-(O-ethylphenylphosphonyl)trifluoroacetophone oxime,
O-(O,O-diethylphosphoryl)trifluoroacetophenone oxime,
O-(O,O-diethylthionophosphoryl)p-isopropyltrifluoroacetophenone oxime,
O-(O,O-diethylphosphoryl)-3,4-dioxymethylenetrifluoroacetophenone oxime.

Also included within the purview of this invention are novel ketones per se from which some of the oxime carbamates and/or phosphates or phosphonates of this invention can be derived. Such ketones are of the general formula:

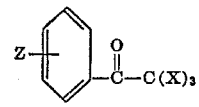

where X is halogen such as F, Cl, Br, or I and Z can be 1 or more substituents such as $C(X)_3$, S-alkyl, or any of the substituents previously denominated for R in the oxime carbamate or phosphate general formula previously given above. These ketones can be prepared in accordance with some of the preparative methods previously discussed. Exemplary of such ketones are:

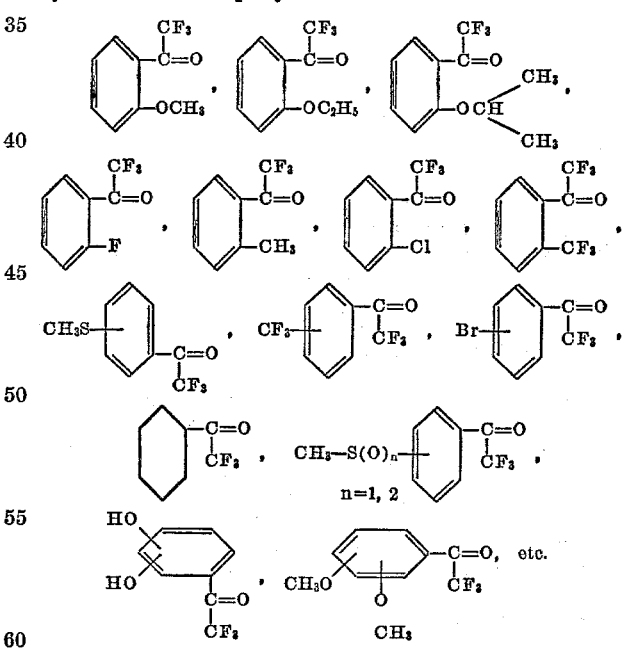

As previously noted, the oxime carbamates, phosphates, or phosphonates of this invention are useful as pesticides, particularly as insecticides. When used as insecticides, the biologically-active oxime carbamates, phosphates, or phosphonates are preferably formulated with a suitable carrier or diluent or combinations thereof.

The term "carrier" or "diluent" as used herein means a material, which can be inorganic or organic and synthetic or of natural origin, with which the active oxime carbamate, phosphate, or phosphonate is mixed or formulated to facilitate its storage, transport, and handling and application to the insects(s) to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments— including, for example, gypsum; tripolite; diatomaceous earth; mineral silicates such as mica; vermiculite; talc; and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the oxime carbamate, phosphate, or phosphonate.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

For application as a soil insecticide, the preferable carrier should be a granular inert carrier, for example, 25/50 mesh (U.S. sieve size) or can also be a simple or compound fertilizer which can be a solid, preferably granular or pelleted, or a liquid, as for example an aqueous solution in which the toxicant is suspended or emulsified.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active oxime carbamate, phosphate or phosphonate ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active oxime carbamate, phosphate, or phosphonate ingredient and a finely-powdered solid carrier such as aforedescribed. The powdered carriers can be oil-treated to improve adhesion to the surface to which they are applied. These dusts can be concentrates, in which case a highly-sorptive carrier is preferably used. These require dilution with the same or a different finely-powdered carrier, which can be of lower sorptive capacity, to a concentration suitable for application.

The compositions of the invention can be formulated as wettable powders comprising a major proportion of the oxime carbamate, phosphate, or phosphonate mixed with a dispersing, i.e., deflocculating or suspending, agent, and, if desired, a finely-divided solid carrier and/or a wetting agent. The oxime carbamate, phosphate, or phosphonate can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e. deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Aerosol," sodium salts of sulfonated castor oil, sodium dodecyl benzene sulfonate.

Granulated or pelleted compositions comprising a suitable carrier having the active oxime carbamate, phosphate, or phosphonate ingredient incorporated therein are also included in this invention. These can be prepared by impregnating a granular carrier with a solution of the oxime carbamate phosphate, or phosphonate, or by granulating a mixture of a finely-divided solid carrier and the active oxime carbamate, phosphate, or phosphonate. The carrier used can consist of or contain a fertilizer or fertilizer mixture, as for example, a superphosphate.

The compositions of this invention can also be formulated as solutions of the active oxime carbamate, phosphate, or phosphonate ingredient in an organic solvent or mixtures of solvents, such as for example alcohols; ketones, especially acetone; ethers; hydrocarbons; etc.

Where the toxicant itself is a liquid, these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active oxime carbamate, phosphate, or phosphonate ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active oxime carbamate, phosphate, or phosphonate ingredient is preferably in the nonaqueous phase.

The present invention is further illustrated in greater detail by the following examples, but it is to be understood that the present invention, in its broadest aspects, is not necessarily limited in terms of the reactants, or specific temperatures, residence times, separation techniques, and other process conditions, or dosage levels, exposure times, etc., by which the compounds and/or compositions described and claimed are prepared and/or used.

EXAMPLE 1

Preparation of O-(N-methylcarbamoyl)trifluoroacetophenone oxime 5.7 g. (.03 mole) of trifluoroacetophenone oxime was dissolved in 100 ml. of benzene. To this was added 2.6 g. (.045 mole) of methyl isocyanate. After stirring for 2 hours at room temperature, the reaction was heated to reflux (80° C.) for 3 hrs. The reaction was then concentrated on a roto-evaporator to give 7.0 g. (96%) of the oxime carbamate, which was then analyzed.

*Analysis.*—Theory (percent): C, 48.9; N, 11.4; F, 23.2. Found (percent): C, 49.1; N, 11.8; F, 22.6.

EXAMPLE 2

Preparation of O-(O,O-diethylthionophosphoryl) trifluoroacetophenone oxime 12.7 g. (.067 mole) of trifluoroacetophenone oxime was dissolved in 200 ml. of tetrahydrofuran. 2.5 g. of NaOH in 7 ml. of water was added. The temperature was maintained between 20–25° C. with a water bath. To this mixture was added 11.8 g. (.06 mole) of diethylchlorothiophosphate dissolved in 25 ml. of tetrahydrofuran. The reaction was stirred at room temperature for 1.5 hours after the addition was completed. At this time the reaction was poured into 400 ml. of water and extracted 3 times with 150 ml. of benzene. The benzene phase was then washed 3 times with 200 ml. of 10% NaOH solution, 3 times with 100 ml. of water, and then dried over anhydrous magnesium sulfate. After filtering, the clear brown solution was concentrated on a roto-evaporator to give 20.7 g. (97%) of a yellow liquid, which was then analyzed.

*Analysis.*—Theory: C, 42.3; N, 4.1; P, 9.05, F, 16.7. Found (percent): C, 42.57; N, 4.38; P, 9.02; F, 16.6.

EXAMPLE 3

Preparation of trifluoroacetophenone oxime

To 3.3 g. (0.1 mole) of hydroxylamine in 50 ml. of water was added 17.4 g. (0.1 mole) of trifluoroacetophenone in 50 ml. of ethanol. After the addition was completed, the solution was refluxed (85°) for 6 hours. After cooling, the mixture was poured over cracked ice and the oxime precipitated. 12 g. (63%) of the oxime resulted, which was then analyzed.

*Analysis.*—Theory (percent): C, 50.7; F, 30.2. Found (percent): C, 50.73; F, 29.8.

EXAMPLE 4

Preparation of O-(O,O-dimethylthionophosphoryl) trifluoroacetophenone oxime 10.5 g. (.05 mole) of the sodium salt of trifluoroacetophenone oxime was stirred in 50 ml. of tetrahydrofuran. To this was added 8.0 g. (.05 mole) of dimethyl chlorothiophosphate in 25 ml. of tetrahydrofuran. The temperature rose to 35° C. After stirring for 1 hour at room temperature the reaction was heated to 60° for ½ hour and the reaction mixture then cooled and filtered to remove NaCl. The filtrate was concentrated on a roto-evaporator to give 12.3 g. (80%) of a yellow liquid, which was then analyzed.

*Analysis.*—Theory (percent): C, 39.4; P, 9.85; S, 10.2. Found (percent): C, 39.86; P, 8.8; S, 10.01.

EXAMPLE 5

Preparation of O-(N-methylcarbamoyl) trifluoroacetone oxime 12.7 g. (0.1 mole) of trifluoroacetone oxime was dissolved in 200 ml. of benzene. Two drops of dibutyltin diacetate was added as a catalyst. To this solution was added 8.5 g. (0.15 mole) of methyl isocyanate in 25 ml. of benzene. After stirring at room temperature for 1 hour, the solution was heated to reflux (80°) for 1.5 hours. The solvent was then removed on a roto-evaporator to give 17 g. (92%) of a clear liquid which crystallized on distillation. The final product recovered was then analyzed.

*Analysis.*—Theory (percent): C, 32.7; N, 15.2; F, 31.0. Found (percent): C, 32.98; N, 15.35; F, 31.5.

EXAMPLE 6

Preparation of meta-trifluoromethyl trifluoroacetophenone 50.5 g. (2.1 moles) of magnesium turnings were charged to a 2 liter flask fitted with a mechanical stirrer, reflux condenser, addition tube and thermometer. One ml. of ethyl bromide in 50 ml. ether was added as an activator. 450 g. (2.0 moles) of meta trifluoromethyl bromobenzene in 1200 ml. of ether were added dropwise to the magnesium. The addition time was 5 hrs. The temperature was maintained between 25–30° C. To this dark reaction mixture were added 76 g. (0.66 mole) of trifluoroacetic acid in 750 ml. of anhydrous ether over a two-hour period. The reaction temperature was 35°. The reaction mixture was then refluxed for 2 hours after addition was complete and cooled to 0° C.; then 100 ml. of H₂O were added to the mixture slowly, followed by 200 ml. of concentrated HCl dissolved in 300 ml. of H₂O. The temperature was maintained between 0° to 10° C.

The ether layer was separated and washed twice with 10% Na₂CO₃ solution. The ether layer was then dried over anhydrous MgSO₄, filtered, and the filtrate concentrated on a roto-evaporator. The residue was vacuum distilled at 89°/80 mm. to give 119 g. (85%) of the ketone and then analyzed.

*Analysis.*—Theory (percent): C, 44.7; H, 1.65; F, 47.2. Found (percent): C, 44.6; H, 1.93; F, 47.6.

EXAMPLE 7

The compounds prepared in Examples 1, 2, and 4 were tested for pesticidal activity against house flies. The results shown in Table I are for tests conducted at a wt. percent concentration of 500 parts per million of the active ingredient. In each test, 50 adult house flies were sprayed in a 5-inch diameter stainless steel cage which was faced on the top and bottom with a 14-mesh screen. Flies were kept in the cage for 24 hours at which time the mortality rate was determined. The results obtained for the compounds of Examples 1, 2, and 4 were compared with the results obtained when employing a commercial insecticide sold under the name "Cygon."

TABLE I

| Run No. | Compound | Percent mortality at 500 p.p.m., housefly |
|---|---|---|
| 1 | O-(N-methylcarbamoyl) trifluoroacetophenone oxime (Example 1 compound). | 100 |
| 2 | O-(O,O-diethyl thionophosphoryl) trifluoroacetophenone (Example 2 compound). | 100 |
| 3 | O-(O,O-dimethyl thionophosphoryl) trifluoroacetophenone oxime (Example 4 compound). | 100 |
| 4 | Cygon[1] | 100 |

[1] Cygon is 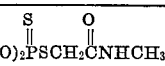

EXAMPLE 8

The products of Examples 1, 2, and 4 were tested for activity against Mexican bean beetles and pea aphids. In the Mexican bean beetle test, lima bean leaves, which were sprayed on their dorsal and ventural surfaces, were offered ten larvae (late second instar) for a 48-hour feeding period. The results shown in Table II are for tests conducted at a wt. percent concentration of 500 parts per million of the active ingredient and of 500 parts per million of Sevin, a commercial insecticide.

In the pea aphid test, adult pea aphids were sprayed with the test composition and transferred to sprayed pea plants where they were held for a 48-hour mortality count.

The results of the Mexican bean beetle and the pea aphid tests are a further indication of the effectiveness of the compounds of this invention as pesticidal compositions.

TABLE III

| Run No. | Compound | Percent mortality at 5 p.p.m., corn root worm |
|---|---|---|
| 1 | O-(N-methylcarbamoyl)trifluoroacetophenone oxime (Example 1 compound). | 100 |
| 2 | O-(O,O-diethyl thionophosphoryl)trifluoroacetophenone oxime (Example 2 compound). | 100 |
| 3 | O-(O,O-dimethyl thionophosphoryl)trifluoroacetophenone oxime (Example 4 compound). | 100 |
| 4 | Diazinon [1] | 100 |

[1] Diazinon is O,O-diethyl O-2-isopropyl-4-methyl-6-pyrimidyl thiophosphate.

EXAMPLE 10

The same tests conducted for corn root worm as shown in Example 7 were conducted at varying p.p.m. in the soil for the compounds of Examples 1 and 2. The results are shown in Table IV.

TABLE IV

| P.p.m. in soil | Percent mortality | Compound |
|---|---|---|
| 2.5 | 100 | 1 |
| 0.63 | 100 | 1 |
| 0.32 | 6 | 1 |
| 0.15 | 0 | 1 |
| 2.5 | 100 | 2 |
| 0.63 | 100 | 2 |
| 0.32 | 93 | 2 |
| 0.15 | 40 | 2 |

The above results show that the N-methyl carbamate of trifluoroacetophenone oxime and its diethyl phosphates are both particularly effective against the corn root worm and that the diethyl phosphate exhibits greater effectiveness than the N-methyl carbamate at very low dosage levels.

It is to be understood that, whenever the terms "halogen" or "halo" were used above in describing the novel ketonic, or novel oxime carbamate, phosphate, and phosphonate compounds of this invention or their preparative methods, such terms were intended to include fluorine, chlorine and bromine. It is also to be understood that the

TABLE II

| Run No. | Compound | Percent mortality at 500 p.p.m. | | |
|---|---|---|---|---|
| | | Mexican bean beetle | Aphid contact | Aphid systemic |
| 1 | O-(N-methylcarbamoyl)trifluoroacetophenone oxime (Example 1 compound) | 100 | 80 | 80 |
| 2 | O-(O, O-diethyl thionophosphoryl)trifluoroacetophenone oxime (Example 2 compound) | 40 | 100 | |
| 3 | O-(O, O-dimethyl thionophosphoryl) trifluoroacetophenone oxime (Example 4 compound) | 100 | 100 | 100 |
| 4 | Sevin[1] | 100 | 100 | 50 |

[1] Sevin is 1-naphthyl-N-methylcarbamate.

EXAMPLE 9

The products of Examples 1, 2, and 4 were tested for activity against the corn root worm. This test is done in the soil with larvae 7–10 days old in the following manner: 75 cc. (90–100 g.) of an air-dried soil-sand (2:1) mixture are placed in an 8 oz. plasticized cup. 10 ml. of a 55 p.p.m. stock* are pipetted onto the surface of the soil. The cup is capped and one hour later it is shaken vigorously 30 times. The cap is removed and two very young corn plants and 5 larvae are introduced. Readings are taken on mortality and feeding 4–5 days later. Compounds giving 80–100% control or preventing feeding are retested. Results are given herebelow in Table III.

* Equivalent to 5 p.p.m. or 10 lbs. in a 6" acre.

moiety Q, as employed hereinabove, expressly includes the terminal, halo-substituted forms:

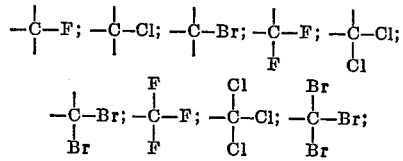

all of whose carbon atoms are α-carbons. These are the most preferred halo-substituted forms; however, when $n$, in the formula $Q=C_nH_{(2n-1)m}(X)_m$ is 2 or more, halo non-terminal substitution, i.e., halo-substitution anywhere along the carbon skeleton except at the terminal α-carbon, can occur as well, either in addition to, or in the absence of terminal halo-substitution; in this latter case the α-carbon preferably should have 2 halo atoms.

It is to be further understood that the moieties R, R', and R" wherever they appear or are described in this description include a tremendous variety of chemical species whose totality is incapable of explicit definition in a disclosure of this general nature. Nevertheless, one skilled in the art would understand from the foregoing description of this invention that the nature of R, R', and R" would probably be not as important as the nature of Q with respect to the relative effect he would believe each would impart to the biological activity of the oxime derivative molecule as a whole. He would further understand that, just so long as R, R', and R" satisfy the requirements of chemical bonding; accommodate preparation of the disclosed ketones, oxime carbamates, phosphates, and phosphonates by acceptable preparative methods such as shown in the following example; and are unreactive or substantially inert with respect to other functional moieties of the molecule; they can be virtually any chemical compound.

EXAMPLE 11

Nitration of trifluoroacetophenone

To 213 ml. of 96% $H_2SO_4$ in a 1 liter flask was added 356 g. (2 moles) of 20% fuming $H_2SO_4$. The temperature was maintained ~15° C. The temperature was lowered to ~5° C. and then 42.3 ml. of 90% $HNO_3$ was added. The temperature was maintained between +5° and +10° C. 100 g. (0.575 mole) of the ketone was slowly added. The clear solution turned yellow and then orange. Addition time was 2 hours. The reaction was stirred overnight at room temperature.

The clear red solution was then poured over ice and filtered. The yellow solid was taken up in ether. The filtrate was extracted with 10× 150 ml. of ether. The ether was then washed with 3× 300 ml. of water and dried over anhydrous $MgSO_4$. This was then filtered and the filtrate was concentrated on a rotovac. The solid was recrystallized from hexane-ether to give yellow crystals. M.P.=53.5°–55° C.

*Analysis.*—Theory (percent): C, 43.8; H, 1.83; F, 26.1. Found (percent): C, 43.9; H, 2.09; F, 26.4.

EXAMPLE 12

Preparation of O-(N-methylcarbamoyl)ortho-isopropoxytrifluoroacetophenone oxime 520 g. (13 moles) of NaOH was dissolved in 600 ml. of water. To this was added 1280 g. (8 moles) of 2-chlorophenol. The reaction was heated to 80° C. and 1230 g. (10 moles) of isopropyl bromide was slowly added over a 4 hour period. After addition was complete the reaction was heated for one hour at 90° C.

Water (2½ liters) was added and the solution was extracted three times with 1 l. of ether. The ether was then dried over $MgSO_4$. The ortho isopropoxy chlorobenzene distilled at 98–100° C./18 mm. The corresponding ketone was prepared via the Grignard procedure previously shown in Example 6. B.P.=91–95° C./8 mm. Oximation of the ketone using 110 g. (.47 mole) of the ketone and 66 g. (2 moles) of hydroxylamine in 1 l. of methanol was carried out at reflux (65° C.) for 2.5 days. Three quarters of the methanol was removed by distillation and 1 l. of water was added. This was extracted two times by 400 ml. of ether and the ether was dried over $MgSO_4$. The filtrate was concentrated via rotovac and the residue vacuum distilled at 110–120° C./3 mm.

*Analysis.*—Theory (percent): C, 53.5; N, 5.67; F, 23.1. Found (percent): C, 53.8; N, 5.96; F, 23.4.

The oxime (10 g., .04 mole) was dissolved in 150 ml. of benzene and a drop of dibutyltindiacetate was added. To this was added 5.7 g. (.10 mole) of $CH_3NCO$ and the reaction was allowed to stir at room temperature overnight. It was then concentrated on a rotovac leaving a tan oil.

*Analysis.*—Theory (percent): C, 51.3; H, 4.93; N, 9.23. Found (percent): C, 50.6; H, 5.06; N, 10.0.

EXAMPLE 13

Preparation of orthomethoxy trifluoroacetophenone

Thirty-nine grams (1.6 moles) of magnesium turnings were charged to a 5-liter flask under a nitrogen blanket. 100 ml. of anhydrous ether and 1 ml. of ethylbromide were added to activate the magnesium. To this was slowly added 300 g. (1.6 moles) of ortho-bromo-anisole in 1300 ml. of anhydrous ether. After addition was complete, 61 grams (0.54 mole) of trifluoroacetic acid in 200 ml. of ether was slowly added. The mixture was then refluxed for 2 hours.

The mixture was then cooled to 0° C. and 200 ml. of water was slowly added. This was followed by 200 ml. of concentrated HCl dissolved in 300 ml. of water.

The organic phase was separated and washed with 1 liter of 10% $Na_2CO_3$ solution followed by 1 liter of water. The organic phase was then dried over anhydrous $MgSO_4$. Distillation gave the ketone at 95° C./10 mm.

*Analysis.*—Theory (percent): C, 53.0; H, 3.44; F, 28.0. Found (percent): C, 53.3; H, 3.49; F, 27.4. Oximation carried out as shown in Example 12.

Six grams (.028 mole) of the orthomethoxy trifluoroacetophenone oxime was dissolved in 125 ml. of benzene. To this was added a drop of dibutyltindiacetate as a catalyst. This was followed by 5.7 g. (1 mole) of $CH_3NCO$. This was stirred at room temperature for 1 hour and then heated to reflux (80° C.) for 2 hours.

The mixture was then evaporated on a roto-evaporator to give an oil. On cooling and scratching with a glass rod, the oil crystallized. Recrystallization from a 3:1 hexane ether solution (hot) gave a product melting at 80–83° C.

*Analysis.*—Theory (percent): C, 47.9; H, 4.02; N, 10.15. Found (percent): C, 47.7; H, 4.07; N, 10.09.

EXAMPLE 14

The ortho trifluoromethyl trifluoroacetophenone was prepared from ortho trifluoromethyl bromobenzene by the same procedure as Example 13. B.P.=96–97° C./80 mm.

The oximation follows the same procedures as shown previously in Example 12, B.P.=50–58° C./0.2 mm.

The oxime (5 grams, .019 mole) was dissolved in 100 ml. of benzene and a drop of dibutyltindiacetate was added as a catalyst. To this was added 5.7 grams (.10 mole) of $CH_3NCO$. The reaction was then heated to reflux (80° C.) for 3 hours.

The solvent was then evaporated on a rotovac to give a clear oil.

*Analysis.*—Theory (percent): C, 42.1; F, 36.3; N, 8.9. Found (percent): C, 42.7; F, 36.3; N, 8.6.

EXAMPLE 15

O(N-methylcarbamoyl)orthofluorotrifluoroacetophenone oxime

This compound was prepared from ortho bromofluorobenzene via a Grignard reaction similar to the one shown in Example 12. The ketone was then oximated as shown in Example 13, and the oxime was carbamoylated as shown in Example 13.

*Analysis.*—Theory (percent): C, 45.4; H, 3.04; N, 10.6. Found (percent): C, 43.7; H, 3.5; N, 9.6.

EXAMPLE 16

O(N-methylcarbamoyl)orthochlorotrifluoroacetophenone oxime

This compound was prepared from ortho bromochlorobenzene via a Grignard reaction similar to the one shown in Example 12. The ketone was then oximated as shown in Example 13 and the oxime was carbamoylated as shown in Example 13.

EXAMPLE 17

O(N-methylcarbamoyl)orthoethoxytrifluoroacetophenone oxime

This compound was prepared from orthoethoxychlorobenzene via a Grignard reaction as shown in Example 12. The ketone thus prepared was oximated in the same way as shown in Example 13 and the oxime was then carbamoylated as shown in Example 13.

*Analysis.*—Theory (percent): C, 49.60; H, 4.52; N, 9.65. Found (percent): C, 49.56; H, 4.52; N, 9.10.

EXAMPLE 18

O(N-methylcarbamoyl)orthomethyltrifluoroacetophenone oxime

This compound was prepared from orthobromotoluene via a Grignard reaction as shown in Example 12. The ketone was oximated as shown in Example 13 and the oxime carbamoylated as shown in Example 13.

*Analysis.*—Theory (percent): C, 50.7; H, 4.24; N, 10.8. Found (percent): C, 50.5; H, 4.46; N, 10.3.

TABLE V $$\text{C}_6\text{H}_4(\text{R})\text{-C}(\text{CF}_3)=\text{NOC}(\text{O})\text{NHCH}_3$$

| Example No. | R | Percent kill at 250 p.p.m. | | |
| --- | --- | --- | --- | --- |
| | | Mex. bean beetle | Housefly | Aphid (contact) |
| 12 | OiC$_3$H$_7$ | 100 | 100 | 100 |
| 13 | OCH$_3$ | 100 | 100 | 90 |
| 14 | CF$_3$ | 100 | 100 | 100 |
| 15 | F | 100 | 100 | 90 |
| 16 | Cl | 100 | | 80 |
| 17 | OC$_2$H$_5$ | 100 | 100 | |
| 18 | CH$_3$ | 100 | 100 | 100 |

What is claimed is:

1. A compound of the formula $$\text{C}_6\text{H}_4(\text{R})\text{-C}(\text{CF}_3)=\text{NOC}(\text{O})\text{N}(\text{R}'')(\text{CH}_3)$$

wherein R is hydrogen, methyl, isopropyl, ethyl, trifluoromethyl, fluorine, chlorine, bromine, methoxy, methylthio, ethoxy, or isopropyloxy; and R" is hydrogen or methyl.

2. A compound according to claim 1, O-(N-methylcarbamoyl) m-methyl trifluoroacetophenone oxime.

3. A compound according to claim 1, O-(N-methylcarbamoyl) meta bromo trifluoroacetophenone oxime.

4. A compound according to claim 1, O-(N-methylcarbamoyl) para methylthiotrifluoroacetophenone oxime.

5. The compound O-(N-methylcarbamoyl 2,4 - dimethoxytrifluoroacetophenone oxime.

6. A compound according to claim 1, O-(N-methylcarbamoyl) meta isopropyltrifluoroacetophenone oxime.

7. A compound according to claim 1, O-(N-methylcarbamoyl) orthomethoxy trifluoroacetophenone oxime.

8. A compound according to claim 1, O-(N-methylcarbamyl) orthofluorotrifluoroacetophenone oxime.

9. A compound according to claim 1, O-(N-methylcarbamoyl) orthoethoxy trifluoroacetophenone oxime.

10. A compound according to claim 1, O-(N-methylcarbamoyl) orthomethyl trifluoroacetophenone oxime.

11. A compound according to claim 1, O-(N-methylcarbamoyl) orthochloro-trifluoroacetophenone oxime.

12. A compound according to claim 1, O-(N-methylcarbamoyl) orthotrifluoromethyl trifluoroacetophenone oxime.

13. A compound according to claim 1, O-(N-methylcarbamoyl) ortho isopropoxy trifluoroacetophenone oxime.

14. A compound according to claim 1, O-(N-methylcarbamoyl) trifluoroacetophenone oxime.

References Cited

UNITED STATES PATENTS 3,299,137  1/1967  Payne et al. _____ 260—566 AC

OTHER REFERENCES

Chem. Abstr., vol. 58, col. 8948(h) (1963).

BERNARD HEFLIN, Primary Examiner

G. A. SCHWARTZ, Assistant Examiner

U.S. Cl. X.R.

260—944, 592; 424—211, 327